Figure 1:
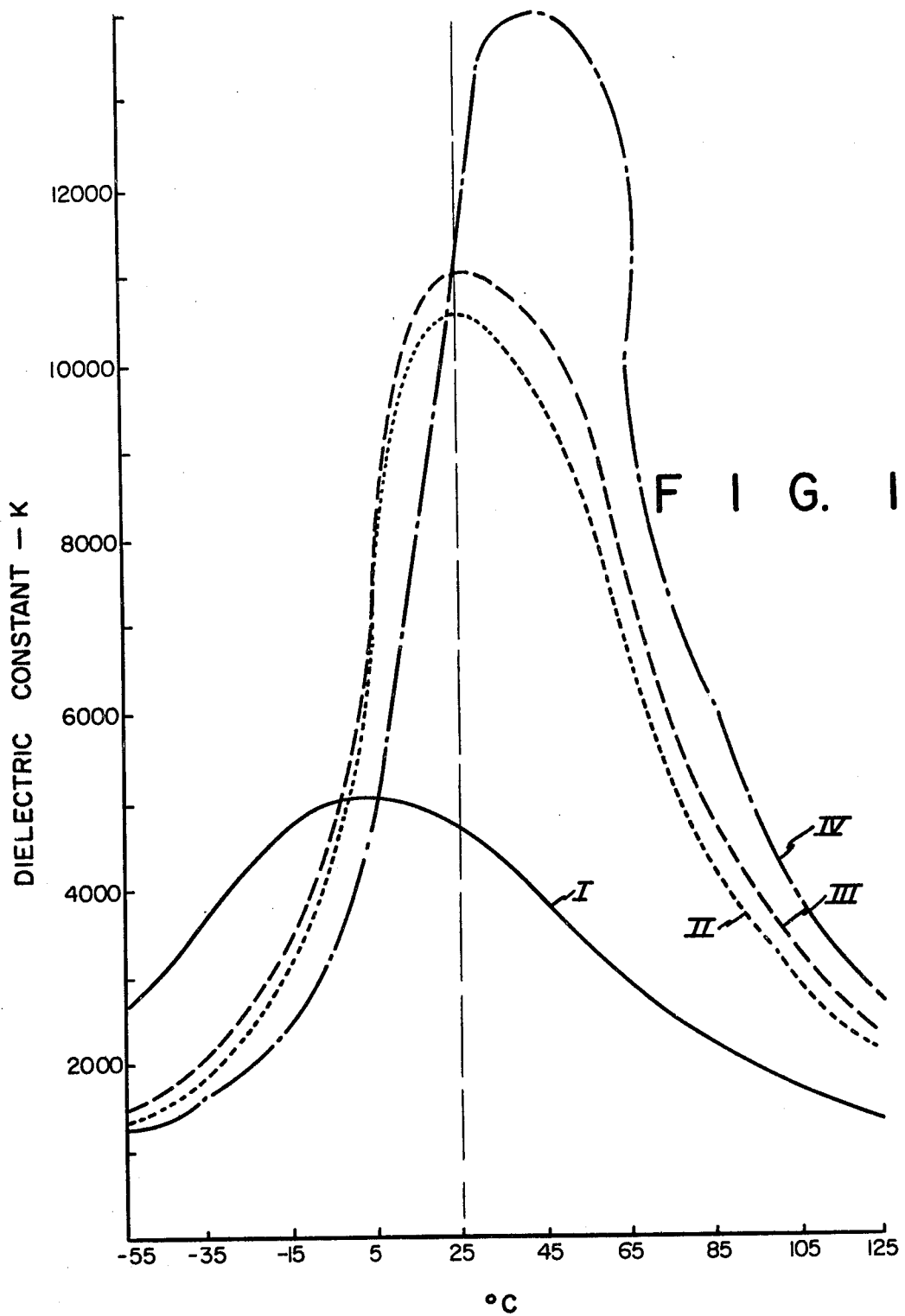

United States Patent [19]

Hanold, III

[11] 4,086,649

[45] Apr. 25, 1978

[54] CERAMIC CAPACITOR MADE FROM FIRING SMALL BARIUM TITANATE PARTICLES

[75] Inventor: R. C. Frederick Hanold, III, Greenville, S.C.

[73] Assignee: Union Carbide Corporation, New York, N.Y.

[21] Appl. No.: 722,628

[22] Filed: Sep. 13, 1976

Related U.S. Application Data

[63] Continuation of Ser. No. 536,620, Dec. 26, 1974, abandoned.

[51] Int. Cl.$^2$ .............................................. H01G 4/12
[52] U.S. Cl. ................................ 361/321; 106/73.31; 29/25.42
[58] Field of Search ...................... 317/258; 252/63.2; 106/73.31; 29/29.42; 361/321

[56] References Cited

U.S. PATENT DOCUMENTS

| 2,452,532 | 10/1948 | Wainer | 106/73.31 |
| 3,292,994 | 12/1966 | Kiss | 317/258 UX |
| 3,534,238 | 10/1970 | Buehler | 317/258 |

OTHER PUBLICATIONS

Mazdiyasni, et al., "Preparation of High-Purity Sub-Micron Barium Titanate Powders," in Journal of Am. Ceramic Society, vol. 52, #10, Oct. 21, 1969, pp. 533–536.

Goswami, J. Phs. Society, Japan 24, pp. 279–289, (1968).

Rose, Condensey Chem. Dictionary, 6th Edition, Reinhold, N. Y., 1963, pp. 491–492.

Primary Examiner—E. A. Goldberg
Attorney, Agent, or Firm—Frederick J. McCarthy, Jr.

[57] ABSTRACT

A capacitor having a high dielectric constant (10,000 at 25° C) is made by firing barium titanate particles sized 1000 A and finer. The barium titanate dielectric includes a ceramic modifier.

4 Claims, 6 Drawing Figures

Monolithic Ceramic Capacitor

Green Ceramic

Printed Electrode Patterns

Capacitor Configuration Before Firing

Monolithic Ceramic Capacitor

CERAMIC CAPACITOR MADE FROM FIRING SMALL BARIUM TITANATE PARTICLES

This application is a continuation of our prior U.S. application Ser. No. 536,620, filing date Dec. 26, 1974, now abandoned.

The present invention is directed to fired ceramic bodies, such as monolithic ceramic capacitors, and to a method for making such bodies.

Barium titanate sized from about 5,000 to 50,000 A, having a tetragonal crystal structure, is commercially used in the making of fired ceramic bodies such as monolithic ceramic capacitors in view of its known dielectric properties, e.g. high dielectric constant, K. The Curie point for such barium titanate, i.e. the temperature at which its dielectric constant is highest, is well above the operating temperature for most capacitor applications. Also, as is well known, the dielectric constant of barium titanate decreases sharply as the temperature varies from the Curie point and a 25° C, is a fraction of the value at the Curie point. It has been conventional practice to add minor proportions of modifier materials such as calcium stannate, and calcium zirconate to barium titanate in the course of preparing a fired ceramic dielectric body to shift the Curie point of the ceramic body to lower temperatures; e.g. 25° C. By so doing, an optimum value of dielectric constant K, can be obtained at 25° C; however, the optimized value of K at this new Curie point, while significantly higher than the initial K value at 25° C, is substantially less than K at the initial Curie point of the additive free barium titanate. That is to say, in shifting the Curie point to a lower temperature, the inherently high dielectric constant of barium titanate has been shifted but also substantially lowered.

It has also been proposed to incorporate very small amounts of metal ions such as iron, nickel, cobalt, calcium, manganese, in cubic structure crystallites of barium titanate in order to inhibit change to the tetragonal crystal form during firing, by inhibiting growth of the crystallites during firing, and thereby produce a barium titanate ceramic dielectric having a cubic crystal structure. With such a practice, an essentially constant dielectric constant, K, is obtained over a wide temperature range, i.e. the peaking of the dielectric constant at the Curie point is suppressed but not shifted and an increase in dielectric constant at relatively low temperatures is not provided as in the case where the Curie point is shifted as a result of additions to tetragonal form barium titanate.

It is therefore an object of the present invention to provide a fired ceramic body consisting essentially of barium titanate having a substantially increased dielectric constant.

Other objects will be apparent from the following description and claims taken in conjunction with the drawing, in which FIG. 1 is a graph showing dielectric constant, K, values for ceramic capacitors in accordance with the present invention in comparison with a prior art capacitor.

Figure 2:
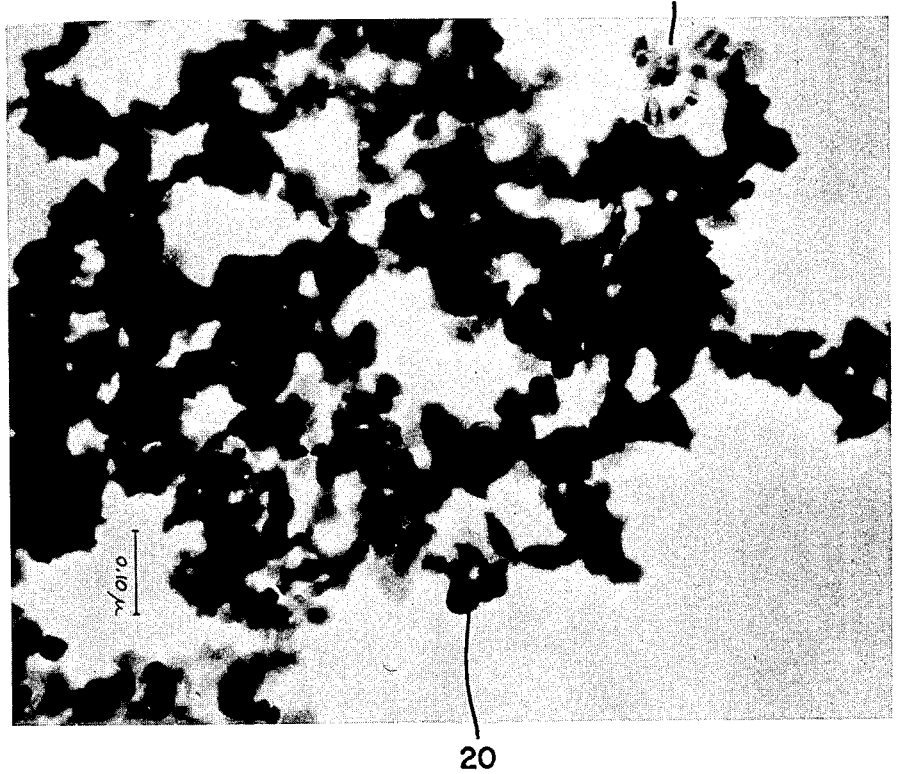
Figure 3:
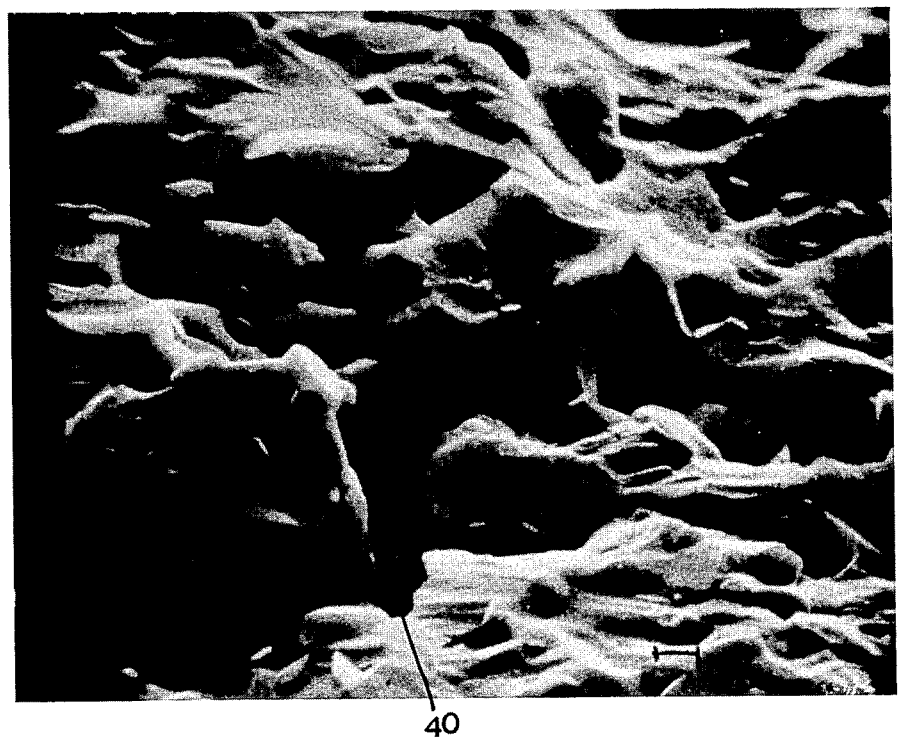
Figure 4A:
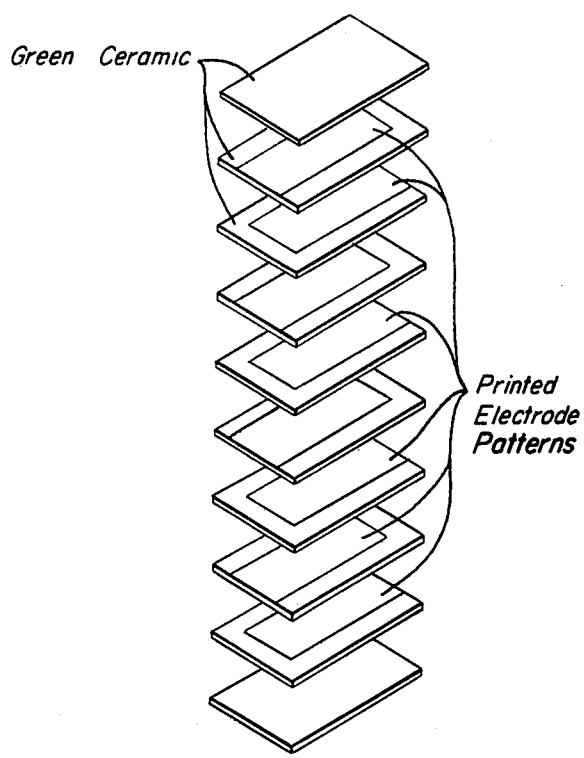
Figure 4B:
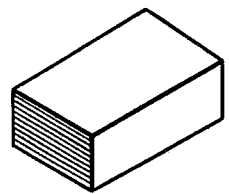
Figure 4C:
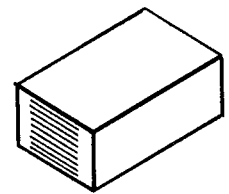

FIG. 2 is a photograph of an electron microscope observation of barium titanate particles useful in the practice of the present invention, and FIG. 3 is a photograph of an electron microscope observation of a fired ceramic barium titanate material in accordance with the present invention and FIGS. 4a, 4b and 4c show successive stages in the conventional making of a monolithic ceramic capacitor.

A fired ceramic body in accordance with the present invention is formed by firing barium titanate particles, substantially all of which, at least 90% by weight, are sized 1000 A and smaller, to produce a fired ceramic dielectric body having a predominantly tetragonal crystal structure.

Finely divided barium titanate powders, as noted above, can be prepared as described in co-pending U.S. patent application, Ser. No. 481,321 and by techniques described in "Preparation and Treatment of Ceramic Powder" Transactions and Journal of the British Ceramic Society 167, Vol. 72, No. 2, 1973. Examples V to XIV hereinbelow, describe the method of patent application Ser. No. 481,321.

Electrical devices such as capacitors can be provided in accordance with the present invention by locating metal electrodes within the green ceramic body prior to firing by techniques known to the art, the fired ceramic providing the dielectric of the capacitor. A plurality of electrodes can be used to provide multilayer ceramic capacitors by procedures known to the art as illustrated in FIGS. 4a, 4b and 4c. Other types of ceramic capacitors, e.g. disc and tubular forms, can be provided in accordance with the present invention by first firing the green ceramic body and then applying the electrode material in conventional fashion.

In the practice of the present invention 1000 A and smaller barium titanate particles, e.g. in the form of a green ceramic body of such barium titanate particles is prepared using conventional known techniques, e.g. by mixing the barium titanate particles with fugitive slip forming and binder materials, e.g. a PVA-water solution, glycerine, deflocculants and wetting agents. The green ceramic body is fired and matured following conventional practice to provide a sound dense ceramic body, e.g. at about 1250° to 1400° C for about 2 to 6 hours. The fired ceramic body is predominantly barium titanate having a tetragonal crystal structure as determined by x-ray analysis at room temperature. The use of barium titanate particles sized substantially all, e.g. at least 90%, 1000 A and smaller results in substantially increased dielectric constant in a fired ceramic body as compared to a fired ceramic body produced in essentially the same manner except for using the larger particle sized customarily employed in the making of fired ceramic bodies, e.g. 5000 to 50,000 A.

In accordance with the present invention ceramic modifier materials in an amount up to 30% by weight of the barium titanate, e.g. 1 to 30%, can be incorporated, e.g. by admixture or solid solution, with the barium titanate prior to firing. Minor amounts of other metal compounds known to the art can be incorporated with the barium titanate. The preferred amount of modifier ceramic material is 5 to 15% by weight. Such modifier ceramic materials include materials known to the art such as zirconates, stannates, titanates, niobates, alumina and rare earth metal oxides, and also solid solutions and unfired mixtures of the foregoing. The weight proportions of metals and oxygen in the matured ceramic body are the same as in the unfired mixtures.

Barium titanate material having a particle sizing suitable for the practice of the present invention can be prepared as described in co-pending U.S. patent application Ser. No. 481,321. Examples V to XIV hereinbelow describe the method of this patent application. It is important in achieving an optimum dielectric constant with the present invention that the modifier ceramic materials also be substantially all sized about 1000 A and smaller. While these materials can be separately prepared and mixed with barium titanate particles, it is advantageous to use barium titanate particles already containing modifier ceramic material in solid solution which can be made by the method of the above-mentioned patent application as described in Examples VIII to XIII of the present specification.

With reference to FIG. 1, the curve designated I shows a plot of dielectric constant, K, versus temperature for a monolithic ceramic made as described in Example I made using commercial barium titanate and calcium zirconate powders sized 30,000 A in a ratio which has been found to provide optimized K at about 25° C. The curves II, III and IV are for ceramic capacitors using essentially the same ratios of barium titanate made from particles sized not more than 1000 A, i.e. about 650 A. The preparation of the capacitors II, III and IV is described in Examples II, III and IV respectively.

As can be seen from FIG. 1, ceramic capacitors in accordance with the present invention (Examples II, III, IV) using particles of 1000 A and smaller have about twice the dielectric constant at 25° C as compared to the ceramic capacitor of Example I made using barium titanate powders of the customary size (30,000 A) for this purpose. That is to say, the calcium zirconate additive used to shift the Curie point to about 25° C substantially lowered the value of dielectric constant in a fired ceramic capacitor made from barium titanate sized 30,000 A, but did not similarly lower the dielectric constant for a fired ceramic capacitor in accordance with the present invention using barium titanate powders sized about 650 A.

Fired ceramic bodies and capacitors in accordance with the present invention can be made using barium titanate-containing powders having a sizing essentially as shown in the photograph of FIG. 2. The barium titanate particles shown in FIG. 2 were formed following the procedure of Example VII. Numeral 10 in FIG. 2 represents a discrete crystallite particle substantially smaller than 1000 A as can be seen from the scale of FIG. 2 and is representative of the particles used in the practice of the present invention. Ball milling of the powder shown in FIG. 2, or similar mechanical agitation such as is encountered in conventional blending techniques results in discrete particles of this size by breaking up agglomerates of attached crystallites such as indicated at 20. In FIG. 2 much of the material is already in the form of discrete crystallites sized 1000 A and smaller but are not clearly discernible since the particles are not disposed in a single layer. A fracture cross-section of a fired dielectric ceramic in accordance with the present invention is shown in FIG. 3. The high dielectric ceramic of FIG. 3 was formed as in Example III. The fired ceramic material of FIG. 3 is formed of crystallites such as indicated at 40 which are tetragonal in crystal structure as determined by x-ray diffraction analysis and substantially larger than the unfired powder crystallites of FIG. 2. The high dielectric constant fired ceramic material of the present invention is predominantly, i.e. 50% by weight or more in a polycrystalline form having a tetragonal crystal structure.

EXAMPLE I

Commercial barium titanate powder (30,000 A average particle size) and minor amounts of prior art modifiers and grain growth inhibitors were mixed in the proportions indicated below:

| | | |
|---|---|---|
| Barium Titanate (30,000 A) | 87.89 | parts by weight |
| Calcium Zirconate (30,000 A) | 9.88 | " |
| Magnesium Zirconate (30,000 A) | 1.38 | " |
| Cerium Zirconate (30,000 A) | 0.099 | " |
| Chromium Nitrate (30,000 A) | 0.26 | " |

Approximately equal parts by weight of the above mixture and 11% PVA solution were combined to conventionally form a slip which was cast to provide green ceramic tape about 2–2.5 mils thick. Rectangular electrode patterns (0.51 cm × 0.635 cm) were screen printed on green tape using a 50% Pd, 50% Ag ink. Portions of the green tape having electrode patterns were placed together and fired at about 1316° C for about 4 hours. The resulting body was a sound dense fired ceramic monolithic capacitor. The dielectric constant, K, of the capacitor is plotted versus temperature in the graph of FIG. 1.

In connection with the following examples II, III and IV two lots of barium titanate-calcium zirconate powder (sized about 650 A) were prepared following the procedure of Example VIII. One lot was particles of 90% by weight barium titanate—10% by weight calcium zirconate. The other lot was of particles 70% barium titanate—30% calcium zirconate. Particles from these lots were blended to provide the proportions indicated for the powders in Examples II, III and IV.

EXAMPLE II

Approximately equal parts by weight of barium titanate + calcium zirconate powders (650 A; 86.7% BaTiO$_3$, 13.3% CaZrO$_3$) and 11% PVA solution were combined to conventionally form a slip which was cast to provide green ceramic tape about 2–2.5 mils thick. Rectangular electrode patterns (0.51 cm × 0.635 cm) were screen printed on green tape using a 50% Pd, 50% Ag ink. Portions of the green tape having electrode patterns were placed together and fired at about 1316° C for about 4 hours. The resulting body was a sound, dense fired ceramic monolithic capacitor. The dielectric constant, K, of the capacitor is plotted versus temperature in the graph of FIG. 1.

EXAMPLE III

Approximately equal parts by weight of barium titanate + calcium zirconate powder (650 A; 87.4% BaTiO$_3$, 12.6% CaZrO$_3$) and 11% PVA solution were combined to conventionally form a slip which was cast to provide green ceramic tape about 2–2.5 mils thick. Rectangular electrode patterns (0.51 cm × 0.635 cm) were screen printed on green tape using a 50% Pd, 50% Ag ink. Portions of the green tape having electrode patterns were placed together and fired at 1316° C for about 4 hours. The resulting body was a sound, dense fired ceramic monolithic capacitor. The dielectric constant K, of the capacitor is plotted versus temperature in the graph of FIG. 1.

EXAMPLE IV

Approximately equal parts by weight of barium titanate + calcium ziconate powder (650 A; 88.2% BaTiO$_3$, 11.8% CaZrO$_3$) and 11% PVA solution were combined to conventionally form a slip which was cast to provide green ceramic tape about 2–2.5 mils thick. Rectangular electrode patterns (0.51 cm × 0.635 cm)

were screen printed on green tape using a 50% Pd, 50% Ag ink. Portions of the green tape having electrode patterns were placed together and fired at about 1316° C for about 4 hours. The resulting body was a sound, dense fired ceramic monolithic capacitor. The dielectric constant, K, of the capacitor is plotted versus temperature in the graph of FIG. 1.

EXAMPLE V

The purpose of this example is to demonstrate the preparation of sub-micron size barium titanate powder. The solution used in this example was prepared in the following way: an aqueous solution of tetraisopropyl titanate was first prepared by slowly adding 100 g of tetraisopropyl titanate to 200g of glacial acetic acid with agitation. The whole solution was then added slowly to 700 g of water with agitation. The aqueous solution of tetraisopropyl titanate so prepared was then added to and thoroughly mixed with about 1 liter of corn syrup (Globe), 89.4g of anhydrous barium acetate were then separately dissolved in enough water to obtain complete dissolution. The barium acetate solution was then added to and thoroughly mixed with the tetraisopropyl titanate corn syrup solution. The resulting solution was then heated on a hot plate until dry. During this process, the solution was converted into a char. The resulting char was then ignited in a furnace at 600° C with an excess of air until all the carbonaceous material was burned off. The resulting powder was characterized by x-ray diffraction to be barium titanate. Its crystallite size was estimated from x-ray line broadening to be in the 510 A range.

EXAMPLE VI

The purpose of this example is to demonstrate the preparation of sub-micron size barium titanate powder. The solution used in this example was prepared in the following way: 22.22g of anhydrous barium acetate were dissolved into 50cc of water, 213.5g of corn syrup (Isomerose) were added to and thoroughly mixed with that solution, 50g of 80 wt.% triethanolamine titanate in isopropanol was then added to and thoroughly mixed with the barium acetate—corn syrup solution. In the same manner as in Example V the resulting solution was converted to a char, which was then ignited at 600° C in air. The resulting powder was characterized by x-ray diffraction to be barium titanate. Specific surface area of the powder was measured by B.E.T. to equal 17 m$^2$/g. Crystallite size of the powder was estimated from x-ray line broadening to be in the 310 A range.

EXAMPLE VII

The purpose of this example is to demonstrate the preparation of sub-micron size barium titanate powder. The solution used in this example was prepared in the following way: 100g of reagent grade sucrose was dissolved in 150 cc of warm water, 22.22 g. of anhydrous barium acetate was added and dissolved into the sucrose solution, 50g of 80 wt.% triethanolamine titanate in isopropanol were then added to and thoroughly mixed with the barium acetate-sucrose solution. In the same manner as in example V, the resulting solution was converted to a char, the char was then ignited at 600° C in air. The resulting powder was characterized by x-ray diffraction to be barium titanate. Specific surface area of the powder was measured by B.E.T. to equal 17.2 m$^2$/g. Crystallite size of the powder was estimated from x-ray line broadening to be in the 360 A range.

EXAMPLE VIII

The purpose of this example is to demonstrate the preparation of sub-micron size barium titanate powder containing 10% by weight calcium zirconate. The solution used in this example was prepared in the following way: 500g of commercial sucrose was dissolved into 750cc of warm water, 111.5g of anhydrous barium acetate was added and dissolved into the sucrose solution, 250g of 80wt.% triethanolamine titanate in isopropanol were then added to and thoroughly mixed with the resulting solution, 41.1cc of an aqueous solution of calcium acetate (containing 3.49g CaO) previously prepared by dissolving 955g of anhydrous calcium acetate in enough water to yield 4 liters of solution and assayed to contain 84.5g of CaO per liter of solution, were added to and thoroughly mixed with the sucrose solution; 21cc of aqueous zirconium acetate solution (containing 7.57g of ZrO$_2$) was added and thoroughly mixed with the sucrose solution. In the same manner as in Example V, the resulting aqueous mixture was converted to a char. The char was then ignited at 600° C. The resulting powder was characterized by x-ray diffraction to be barium titanate with calcium zirconate in solid solution. Specific surface area of the powder was measured to equal 20.85 m$^2$/g. Crystallite size of the powder was estimated from x-ray line broadening to be in the 235 A range.

EXAMPLE IX

The purpose of this example is to demonstrate the preparation of sub-micron size barium titanate powder containing 13 wt.% bismuth titanate. The solution used in this example was prepared in the following way: 600g of commercial sucrose was dissolved in 800cc of warm water, 111.5g of anhydrous barium acetate was added to and dissolved into that solution, 278.4g of 80 wt.% triethanolamine titanate in isopropanol was then added to and thoroughly mixed with the sucrose solution, 48.2g of bismuth ammonium citrate solution, containing 11.55g of Bi$_2$O$_3$, was added to the sucrose solution. Upon addition of the bismuth ammonium citrate solution, a gelatinous precipitate formed which was dissolved by heating the mixture to 74° C. In the same manner as in Example V, the resulting solution was converted to a char. The char was then ignited at 600° C in air. The resulting powder was characterized by x-ray diffraction to be barium titanate with bismuth titanate in solid solution. Specific surface area of the powder was measured to equal 18.8 m$^2$/g. Crystallite size of the powder was estimated from x-ray line broadening to be in the 270 A range.

EXAMPLE X

The purpose of this example is to demonstrate the preparation of sub-micron size barium titanate powder containing 9 wt.% of calcium stannate. The solution used in this example was prepared in the following way: 600g of commercial sucrose was dissolved into 750cc of warm water, 111.5g of anhydrous barium acetate was added to and dissolved into that solution, 250g of 80 wt.% triethanolamine titanate in ispropanol was then added to and thoroughly mixed with the sucrose solution, 32.6cc of calcium acetate solution, containing 2.77g of CaO, as used in Example VIII was then added to and thoroughly mixed with the sucrose solution, 350cc of glacial acetic acid containing 6.645g SnO in solution, was then added to and thoroughly mixed with the sucrose solution. In the same manner as in Example V, the resulting mixture was converted to a char. The char was then ignited at 600° C in air. The resulting powder was characterized by x-ray diffraction to be barium titanate with calcium stannate in solid solution. Specific surface area of the powder was measured to equal 22.95 m$^2$/g. Crystallite size of the powder was estimated from x-ray line broadening to be in the 250 A range.

EXAMPLE XI

The purpose of this example is to demonstrate the preparation of sub-micron size barium titanate powder containing 11.9 wt.% bismuth titanate, 7.9 wt.% calcium stannate, 0.8 wt.% cobalt oxide and 0.2 wt.% manganese oxide. The solution used in this example was prepared in the following way: 600g of commercial sucrose was dissolved into 750cc of warm water 111.5g of anhydrous barium acetate was added to and dissolved into that solution, 0.325cc of manganous nitrate 50 wt.% solution was added to and thoroughly mixed with the sucrose solution, 278.4g of 80 wt.% triethanolamine titanate in isopropanol was then added to and thoroughly mixed with the sucrose solution, 0.86g of hydrous cobalt acetate was added to and dissolved in the sucrose solution, 48.2g of bismuth ammonium citrate solution, containing 11.55g of $Bi_2O_3$, was added to and thoroughly mixed to the solution in the same way as described in Example 18, 30.9cc of calcium acetate solution containing 2.62g of CaO, as used in Example VIII was added to and thoroughly mixed with the sucrose solution, 500cc of glacial acetic acid containing 5.825g Sn in solution, was then added to and thoroughly mixed with the solution. In the same manner as in Example V, the resulting solution was converted to a char. The char was then ignited at 600° C in air. The resulting powder was characterized by x-ray diffraction to be barium titanate with the oxide additives in solid solution. Specific surface area of the powder was measured to equal 19.87 m$^2$/g. Crystallite size of the powder was estimated from x-ray line broadening to be in the 250 A range.

EXAMPLE XII

The purpose of this example is to demonstrate the preparation of sub-micron size barium titanate powder containing 2.5% by weight sodium bismuth titanate ($NaBi_9Ti_8O_{30}$). The solution used in this example was prepared in the following way: 500g of commercial sucrose was dissolved into 500cc of warm water, 104g of anhydrous barium acetate was added and dissolved into the sucrose solution, 238.26g of 80 wt.% triethanolamine titanate in isopropanol were then added to and thoroughly mixed with the resulting solution, 0.148g of anhydrous sodium acetate was added to and dissolved in the sucrose solution, 15.81g of bismuth ammonium citrate solution, containing 3.788g of $Bi_2O_3$, was added to and thoroughly mixed with the solution. Upon addition of the bismuth ammonium citrate solution, a gelatinous precipitate formed which was dissolved by heating the mixture to 74° C. The resulting solution was converted to a char by heating, and the char was then ignited at 600° C in air. The resulting powder was characterized by x-ray diffraction to be barium titanate with the oxide additions in solid solution. Specific surface area of the powder was measured to equal 13.04 m$^2$/g. Crystallite size of the powder was estimated from x-ray line broadening to be in the 450 A range.

EXAMPLE XIII

The purpose of this example is to demonstrate the preparation of sub-micron size barium titanate powder containing 1 wt.% of chromium oxide. The solution used in this example was prepared in the following way: 220g of anhydrous barium acetate was dissolved into one liter of water, 1500g of corn syrup was added to and thoroughly mixed with the barium acetate solution, 500g of 80wt.% triethanolamine titanate in isopropanol was then added to and thoroughly mixed with the resulting solution; the resulting solution was then divided into two equal parts and 3.25g of chromium acetate was added to and dissolved into one of the equal parts. The resulting solution was converted to a char by heating and the char was then ignited at 600° C in air. The resulting powder was characterized by x-ray diffraction to be barium titanate doped with chromium oxide. Specific surface area of the powder was measured to equal 7.72 m$^2$/g. Crystallite size of the powder was estimated from x-ray line broadening to be in the 600 A range.

EXAMPLE XIV

A further series of experiments were conducted in accordance with the teachings of the previous examples illustrate manufacture of diverse mixed oxides in highly reactive, high surface area forms. The results of this series are summarized in Table B.

TABLE B

| | Oxide | Starting Materials | Stoichiometry | Surface Area |
|---|---|---|---|---|
| V | $CaSnO_3$ | Stannous Acetate, Sugar, Calcium Acetate | 1.19 | 40.5 m$^2$/g |
| VI | $CaSnO_3$ | Stannous Tartrate dissolved in acetic acid solution, sugar, Calcium Acetate | 0.91 | 25.1 m$^2$/g |
| VII | $CaSnO_3$ | Stannous Acetate, Sugar, Calcium Acetate | 0.84 | 15.1 m$^2$/g |
| VIII | $Bi_2O_3 \cdot 2TiO_2$ | Bismuth Ammonium Citrate, Sugar, Tyzor TE* | 1.96 | 10.3 m$^2$/g |
| IX | $Bi_2O_3 \cdot 2TiO_2$ | Bismuth Ammonium Citrate, Sugar, Tyzor TE* | | 7.9 m$^2$/g |
| X | $Bi_2O_3 \cdot 2TiO_2$ | Bismuth Ammonium Citrate, Sugar, Tyzor TE* | 2.01 | 23.5 m$^2$/g |
| XI | $CaZrO_3$ | Calcium Acetate, Corn Syrup, Zirconium Nitrate | | 32.9 m$^2$/g |
| XII | $CaZrO_3$ | Calcium - EDTA Complex, Sugar, Zirconium Acetyl Acetate | | 22.1 m$^2$/g |
| XIII | $CaZrO_3$ | Zirconium Acetyl-Complex with Triethanolamine, Sugar, Calcium Acetate | | 46.8 m$^2$/g |
| XIV | $Nd_2O_3 \cdot 2TiO_2$ | Neodymium Acetate, Sugar, Tyzor TE* | 2.042 | 25.1 m$^2$/g |

*DuPont tradename for tetraethanolamine titanate in isopropyl alcohol.

What is claimed is:

1. A high dielectric constant ceramic capacitor having a dielectric constant (K) of at least 10,000 at 25° C, said capacitor comprising in combination a dielectric ceramic body having a predominantly tetragonal crystal structure formed by the firing of ceramic particles at a temperature in the range of about 1250° to 1400° C substantially all of said particles being not larger than 650 A prior to firing, at least 70% by weight of said particles being barium titanate and from about 1 to 30% by weight of said particles being ceramic modifier material in solid solution with barium titanate; and electrodes formed in said body in capacitive relationship.

2. A ceramic capacitor in accordance with claim 1 wherein said ceramic modifier material is from about 5 to 15% by weight.

3. In a method of forming a ceramic capacitor including steps of forming a green ceramic body from ceramic particles, forming metal electrodes in capacitive relationship in said green ceramic body and thereafter firing said green ceramic body at a temperature in the range of about 1250° to 1400° C., the improvement for providing a ceramic capacitor having a dielectric constant (K) of at least 10,000 at 25° C which comprises forming said green ceramic body of ceramic particles substantially all of which are not larger than 650 A prior to firing, at least 70% by weight of said particles being barium titanate and from about 1 to 30% by weight of said particles being ceramic modifier material in solid solution with barium titanate.

4. A method in accordance with claim 3 wherein said ceramic modifier material is from about 5 to 15% by weight.

* * * * *